United States Patent
Mahato

(10) Patent No.: US 8,538,121 B2
(45) Date of Patent: Sep. 17, 2013

(54) METHOD OF DYNAMIC CELL TRACKING IN A SAMPLE

(75) Inventor: Bikash Chandra Mahato, Bangalore (IN)

(73) Assignee: GE Healthcare Bio-Sciences AB, Uppsala (SE)

( * ) Notice: Subject to any disclaimer, the term of this patent is extended or adjusted under 35 U.S.C. 154(b) by 28 days.

(21) Appl. No.: 13/321,315

(22) PCT Filed: May 17, 2010

(86) PCT No.: PCT/SE2010/050530
§ 371 (c)(1),
(2), (4) Date: Nov. 18, 2011

(87) PCT Pub. No.: WO2010/134875
PCT Pub. Date: Nov. 25, 2010

(65) Prior Publication Data
US 2012/0070060 A1  Mar. 22, 2012

(30) Foreign Application Priority Data
May 19, 2009 (IN) .......................... 1023/DEL/2009

(51) Int. Cl.
*G06K 9/00* (2006.01)
(52) U.S. Cl.
USPC ........................................... 382/133; 382/103
(58) Field of Classification Search
None
See application file for complete search history.

(56) References Cited

U.S. PATENT DOCUMENTS

2008/0226126 A1*  9/2008  Ohno ............................ 382/103
2010/0046823 A1*  2/2010  Ruanaidh et al. ............. 382/133

FOREIGN PATENT DOCUMENTS

WO    WO 2008/100704    8/2008

OTHER PUBLICATIONS

Kang Li; Eric D. Miller; Lee E. Weiss; Phil G. Campbell; and Takeo Kanade, "Online Tracking of Migrating and Proliferating Cells Images with Phase-Contrast Microscopy", Jun. 17-18, 2006, IEEE Computer Society Workshop on Mathematical Methods in Biomedical Image Analysis, New York City, NY, USA.*
Li, K., et al., Proceedings of the 2006 Conference on Computer Vision and Pattern Recognition Workshop, Jun. 17, 2006.
Meijering, E., et al., Seminars in Cell and Developmental Biology, (2009), 20(8):894-902.

* cited by examiner

*Primary Examiner* — Samir Ahmed
*Assistant Examiner* — Siamak Harandi

(57) ABSTRACT

This invention provides a method of dynamic cell tracking in a sample comprising the steps of, generating a correspondence measure between cells in two consecutive time-elapsed images of a sample, evaluating said correspondence measure to generate events linking individual cells in the two images, the events being selected from the group: unchanged, cell removal, cell migration, cell collision and cell division, and providing a tracking output of events linking individual cells in the two images. In the invention, the step of establishing linking events involves verifying the correctness of generated cell collision and cell division events, by calculating an adaptive threshold value for each such event and comparing the threshold value with an event parameter. There is further provided a system for dynamic cell tracking in a sample.

9 Claims, 8 Drawing Sheets

Previous

Current

Previous

Current

Previous

Current

METHOD OF DYNAMIC CELL TRACKING IN A SAMPLE

CROSS-REFERENCE TO RELATED APPLICATIONS

This application is a filing under 35 U.S.C. §371 and claims priority to international patent application number PCT/SE2010/050530 filed May 17, 2010, published on Nov. 25, 2010 as WO 2010/134875, which claims priority to application number 1023/DEL/2009 filed in India on May 19, 2009.

FIELD OF THE INVENTION

The present invention relates to a system and method for determining the location of biological material.

BACKGROUND OF THE INVENTION

In the past decade, there has been an explosive increase in the amount of data measurements conducted relating to biological processes. This explosion can be attributed mainly to improvements in technology-particularly, computer technology. However, the amount of data has increased, but the analysis of this data has failed to keep pace. Accordingly, there is an increasing need for automated analysis of data.

One of the most fundamental observations of biological data is to measure the behavior of cells against the passage of time. Cells vary in number and structure as time passes. Specifically, the sequential behavior of measured quantities rotating to cell events, such as growth, structure, cell division, cell death is reported to infer and to deduce the causal relationship between applied stimuli and cell behavior. To give a concrete example, for high throughput assays the addition of a drug to a well and the magnitude of changes to cells in structure and in number as well as the rate of change of structure and number is of importance in determining the efficacy of this drug in clinical treatment. Moreover, the exact point in a cell life when a drip takes effect is also interesting. For example, a treatment for cell cancer may inhibit cell division. Most research that demands cell tracking requires the expertise of a trained biologist. The costs of tracking are prohibitively high for high throughput screening. Below we present a method of cell tracking that is appropriate for high throughput assays.

Typically, one would need to employ a computer in order to track a cell to mark a single cell of a plurality of cells with a dye and track the cell as it moves from one frame to another. This process of tracking the marked cell movement is error-prone and time consuming, because even though the one cell was marked it still may not be distinguishable from the plurality of cells existing from one frame to another. Also, the dye utilized to mark the cell may hinder the normal cell functions so one would not obtain a true image of how the cell works as it moves from one frame to another.

There are several different algorithms utilized by a computer for cell tracking, such as a Kalman filter and particle filter. Kalman filter is an efficient recursive filter which estimates the state of a dynamic system from a series of incomplete and noisy measurements. The Kalman filter employs a tracking method based on a second order statistics in order to track the movement of an object, such as a cell from one point to another. Kalman filter employs the tracking method that assumes dynamic and measurement models are linear with Gaussian noise. However, for cellular images sequences, there are many interfering factors, e.g. background clutter and it is difficult to produce a clean image for cellular boundaries, which often causes the collapse of Kalman filter tracking.

Particle filtering which is a form of a Sequential Monte Carlo method employs sophisticated model estimation techniques based on random sampling. The particle filter does not require the assumption of a Gaussian distribution and the dynamic and measurement models may also be nonlinear. Particle Filters suffer from none of the disadvantages of the Kalman Filter. However there is a penalty to be paid in loss of speed. However, that being said, particle filters are not slow.

The fundamental difference between particle filters and Kalman Filters is in how they represent state. The Kalman Filter stores one value for each of the parameters and stores the corresponding variances and correlations between each parameter in the form of a covariance matrix. Particle Filters maintain a collection of "particles", each corresponding to a pair comprising the state vector and its corresponding weight. The overall behavior of the object being tracked can be derived from the statistics of the collection of particles. A single object may be tracked using dozens, hundreds or even thousands of particles.

Tracking of cells over time-elapsed images involves two consecutive images at a time. Between the two images one (previous frame) is acquired earlier than another (current frame). The base idea of particle filter is the approximation of relevant probability distributions using the concepts of sequential importance sampling and approximation of probability distributions using a set of discrete random samples with associated weights. The purpose of particle filter algorithm is to identify events linking current frame with the previous frame and has been proven efficient for non-liner movement of cells in time point images. Particle filter algorithm requires each cell of the image to be represented by a set of measures called state vector/feature vector. In the current scenario, the feature vector contains the measures X-, Y-coordinates, and Form Factor and these are primary input for tracking cells over time.

One example of a particle filter application is disclosed in WO 2008/100704 the disclosure of which is incorporated herein by reference in its entirety.

Feature vectors are generated from the segmented image. Hence, better segmentation is the key to the tracking algorithm. The particle filter generates a cloud of particles around each cell. The cloud pursues a cell in the frame and is used for tracking the cell from the next frame. Tracking in particle filter is achieved through correspondence measure of cells between the two consecutive frames. Correspondence is obtained by calculating the entropy between the each cloud (pursuing a cell of the previous frame) and each feature vectors (representing a cell in the current frame). Correspondence measure is presented in the form of two matrices, one representing the correspondence between previous to current (hereafter: Cloud_to_Measure) while another represents the correspondence between current to previous (hereafter: Measure_to_Cloud). In a particle filter application, the correspondence measures are evaluated to generate events linking individual cells in the two consecutive images, the events being selected from the group: unchanged, cell removal, cell migration, cell collision and cell division from parent-child relationship. However, sometimes the cell correspondence leads to generate a false event and is required to verify the cell correspondence.

SUMMARY OF THE INVENTION

The object of the invention is to provide a new method and system for dynamic cell tracking in a sample, which method and system overcomes one or more drawbacks of the prior art. This is achieved by the method and system as defined in the independent claims.

One advantage with the method and system according to the present invention is that it provides an automated decision making system for validating the events generated by particle filter which may improve the cell tracking accuracy over existing cell tracking algorithms by up to 30%.

According to one aspect there is provided a method of dynamic cell tracking in a sample comprising the steps:
- generating a correspondence measure between cells in two consecutive time-elapsed images of a sample,
- evaluating said correspondence measure to generate events linking individual cells in the two images, the events being selected from the group: unchanged, cell removal, cell migration, cell collision and cell division,
- providing a tracking output of events linking individual cells in the two images,
- wherein the step of establishing linking events involves verifying the correctness of generated cell collision and cell division events, by calculating an adaptive threshold value for each such event and comparing the threshold value with an event parameter.

According to another aspect, the adaptive threshold value is calculated from the size of at least one of the cells involved in the generated event. Moreover, the adaptive threshold value may be proportional to the radius of the smallest cell involved in the generated event. More specifically, the adaptive threshold value may be calculated by multiplying the radius of the smallest cell with variable depending on the cell motion in the sample, and the variable may in one embodiment be a user defined parameter in the range of 5 to 20, preferably 7.5 to 15.

According to one aspect, for generated cell collision events, the event parameter is a spatial relationship between the linked cells in the prior image, and for generated cell division events, the event parameter is a spatial relationship between the linked cells in the posterior image. More specifically, for generated cell collision events, the event parameter may be the distance between the linked cells in the prior image, and for generated cell division events, the event parameter may be the distance between the linked cells in the posterior image.

According to one aspect, the step of generating a correspondence measure involves a particle filter algorithm.

According to one aspect, the method may further comprise the step of:
- calculating, for each tracked cell, a parent and child count from the generated tracking output,
- when parent count >1, a collision event is generated linking parent cells to child cell,
- when child count >1, a division event is generated linking child cells to parent cell,
- verifying the correctness of generated cell collision and cell division events, by calculating an adaptive threshold value for each such event and comparing the threshold value with an event parameter.
- updating the tracking output.

According to still one aspect, there is provided a system for dynamic cell tracking in a sample, comprising an imaging system arranged to provide consecutive time-elapsed images of the sample, and an image-receiving device arranged to track cells in a sample in accordance with the method of claims 1 to 9.

Embodiments of the invention are defined in the dependent claims.

DETAILED DESCRIPTION OF THE INVENTION

The presently preferred embodiments of the invention are described with reference to the drawings, where like components are identified with the same numerals. The descriptions of the preferred embodiments are exemplary and are not intended to limit the scope of the invention.

Figure 1:
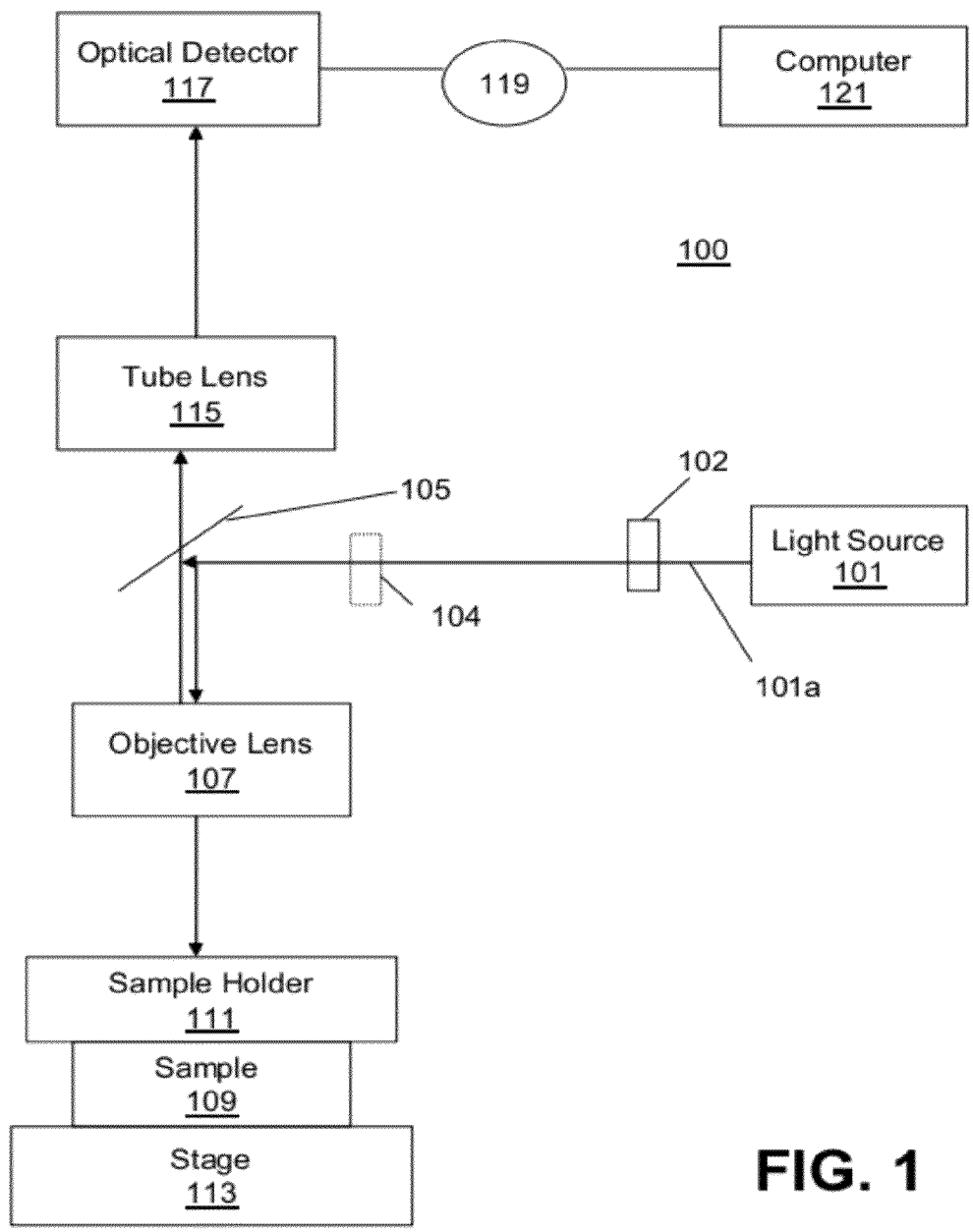
FIG. 1 is a block diagram of a typical imaging system in accordance with the invention.

FIG. 1 illustrates a block diagram of the essential components of a typical digital microscope system. This automated digital microscope system 100 includes the following components: a light source 101, a collimator 102, an optional aspherical optics 104 (in case of line scanning microscopy), beam folding optics 105, objective lens 107, a sample 109, a sample holder 111, a stage 113, a tube lens 115, an optical detector 117, an optional communication link 119 and an optional computer 121.

Light source 101 may be a lamp, a laser, a plurality of lasers, a light emitting diode (LED), a plurality of LEDs or any type of light source known to those of ordinary skill in the art that generates a light beam 101a. Light beam 101a is delivered by: the light source 101, collimator 102, optional aspherical optics 104, beam-folding optics 105 and objective lens 107 to illuminate sample 109. Sample 109 may be live biological materials/organisms, biological cells, non-biological samples, or the like. Aspherical optics 104 is a typical Powell lens. Beam-folding optics 105 is a typical scanning mirror or a dichroic mirror. The light emitted from the sample 109 is collected by objective lens 107, and then an image of the sample 109 is formed by the typical tube lens 115 on the optical detector 117. The optical detector 117 may be a charged coupled device (CCD), a complementary metal-oxide semiconductor (CMOS) image detector or any 2-D array optical detector utilized by those of ordinary skill in the art. Optical detector 117 is optionally, electrically or wirelessly, connected by the communications link 119 to the computer 121. In another embodiment, the optical detector 117 may be replaced with a typical microscope eyepiece or oculars that work with objective 107 to further magnify intermediate images so specimen details can be observed. Also, there may be two, three or more optical detectors 117 utilized in place of optical detector 117. Sample 109 is mounted on the sample holder 111, which may be referred to as a typical microtiter plate, a microscope slide, a chip, plate of glass, Petri dish, or any type of sample holder.

In another embodiment, the microscope system 100 optionally, may be electrically or wirelessly connected by a communication link 119 to the conventional computer 121. The communication link 119 may be any network that is able to facilitate the transfer of data between the automated microscope system 100 and the computer 121, such as a local access network (LAN), a wireless local network, a wide area network (WAN), a universal service bus (USB), an Ethernet link, fiber-optic or the like.

The microscope system 100 may be referred to as an image transmitting device, imaging device or imaging system that is capable of capturing an image, by utilizing the optical detector 117 or a typical microscope eyepiece, of the sample 109 or any type of object that is placed on the object stage 113. Also, the microscope system 100 may also be, for example, the IN Cell Analyzer 1000 or 3000 manufactured by GE Healthcare located in Piscataway, N.J. Microscope system 100 may be a typical confocal microscope, fluorescent microscope, epi-fluorescent microscope, phase contrast microscope, differential interference contrast microscope, or any type of microscope known to those of ordinary skill in the art. In another embodiment, the microscope system 100 may be a typical high throughput and high content sub cellular imaging analysis device that is able to rapidly detect, analyze and provide images of biological organisms or the like. Also, the microscope system 100 may be an automated cellular and subcellular imaging system.

The optical detector 117 that receives the reflected or fluorescent light from the sample may be a photomultiplier tube, a charged coupled device (CCD), a complementary metal-oxide semiconductor (CMOS) image detector or any optical detector utilized by those of ordinary skill in the art. Optical detector 117 is electrically or wirelessly connected by the communication link 119 to the computer 103. In another embodiment, the optical detector 117 may be replaced with the typical microscope eyepiece or oculars that work with objective lens 107 to further magnify intermediate images so that specimen details can be observed.

The computer 121 may be referred to as an image receiving device 121 or image detection device 121. In another embodiment of the invention, image receiving device 121 may be located inside of the image transmitting device 100. The image receiving device 121 acts as a typical computer, which is capable of receiving an image of the sample 115 from the optical detector 107, then the image receiving device 103 is able to display, save or process the image by utilizing a standard image processing software program, algorithm or equation. Also, the computer 103 may be a personal digital assistant (PDA), laptop computer, notebook computer, mobile telephone, hard-drive based device or any device that can receive, send and store information through the communication link 119. Although, one computer is utilized in this invention a plurality of computers may be utilized in place of computer 121.

Figure 2:
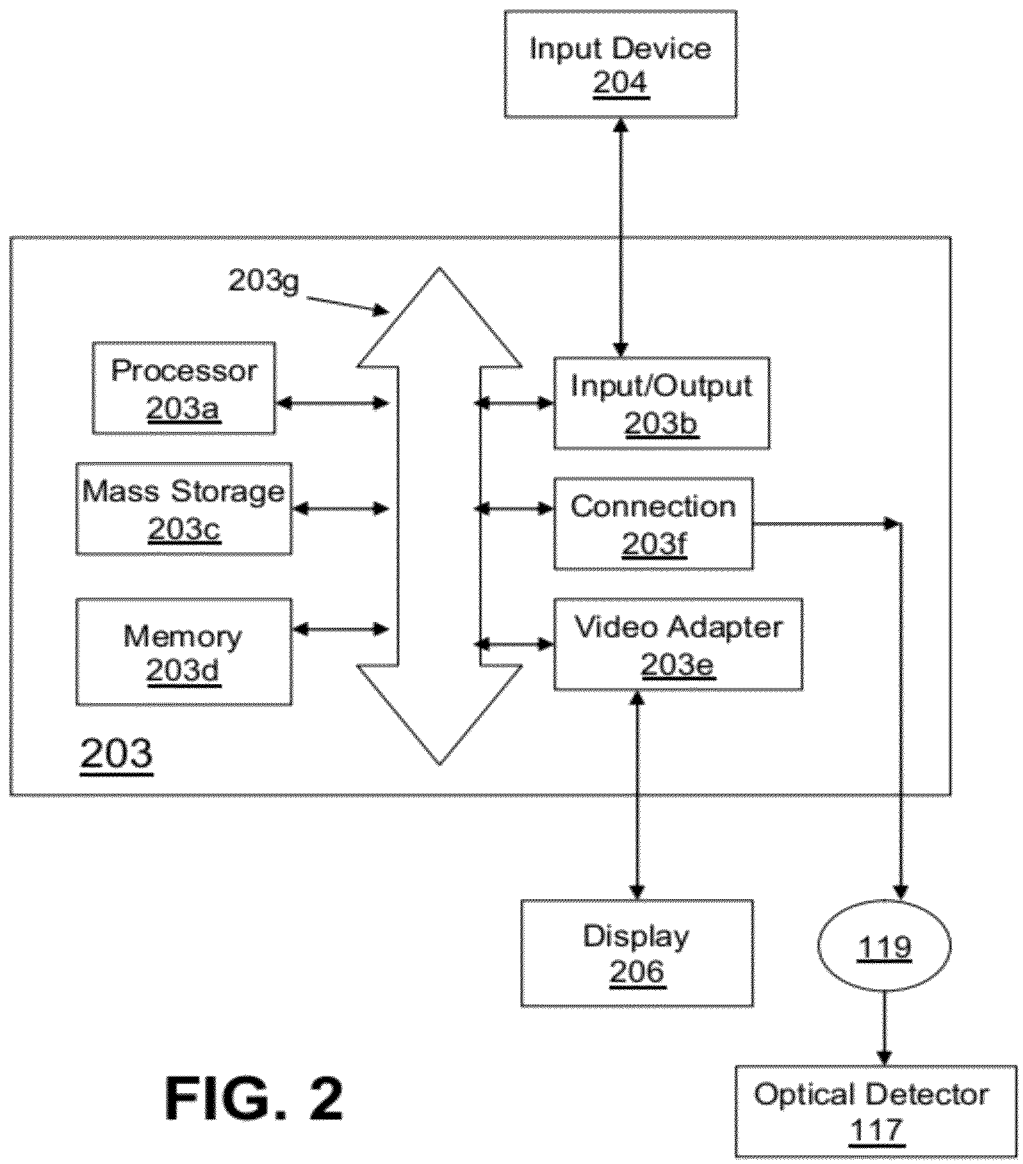
FIG. 2 is a schematic of an image-receiving device of FIG. 1 in accordance with the invention.

FIG. 2 illustrates a schematic diagram of the image-receiving device of the cell tracking system of FIG. 1. Image or imaging receiving device 121 or image receiving device 203 includes the typical components associated with a conventional computer. Image receiving device 203 may also be stored on the image transmitting system 100. The image receiving device 203 includes: a processor 203a, an input/output (I/O) controller 203b, a mass storage 203c, a memory 203d, a video adapter 203e, a connection interface 203f and a system bus 203g that operatively, electrically or wirelessly, couples the aforementioned systems components to the processor 203a. Also, the system bus 203g, electrically or wirelessly, operatively couples typical computer system components to the processor 203a. The processor 203a may be referred to as a processing unit, a central processing unit (CPU), a plurality of processing units or a parallel processing unit. System bus 203g may be a typical bus associated with a conventional computer. Memory 203d includes a read only memory (ROM) and a random access memory (RAM). ROM includes a typical input/output system including basic routines, which assists in transferring information between components of the computer during start-up.

Input/output controller 203b is connected to the processor 203a by the bus 203g, where the input/output controller 203b acts as an interface that allows a user to enter commands and information into the computer through the particle filter graphical user interface (GUI) and input device 204, such as a keyboard and pointing devices. The typical pointing devices utilized are joysticks, mouse, game pads or the like. A display 206 is electrically or wirelessly connected to the system bus 203g by the video adapter 203e. Display 206 may be the typical computer monitor, plasma television, liquid crystal display (LCD) or any device capable of displaying characters and/or still images generated by a computer 203. Next to the video adapter 203e of the computer 203, is the connection interface 203f. The connection interface 203f may be referred to as a network interface, which is connected, as described above, by the communication link 119 to the optical detector 117. Also, the image-receiving device 203 may include a network adapter or a modem, which enables the image receiving device 203 to be coupled to other computers.

Above the memory 203d is the mass storage 203c, which includes: 1.a hard disk drive component (not shown) for reading from and writing to a hard disk and a hard disk drive interface (not shown), 2. a magnetic disk drive (not shown) and a hard disk drive interface (not shown) and 3. an optical disk drive (not shown) for reading from or writing to a removable optical disk such as a CD-ROM or other optical media and an optical disk drive interface (not shown). The aforementioned drives and their associated computer readable media provide non-volatile storage of computer-readable instructions, data structures, program modules and other data for the computer 103. Also, the aforementioned drives include the technical effect of having an algorithm for determining a location of biological material or tracking cell movement, software or equation of this invention, which will be described in the flow chart of FIGS. 4 and 5.

Figure 3:
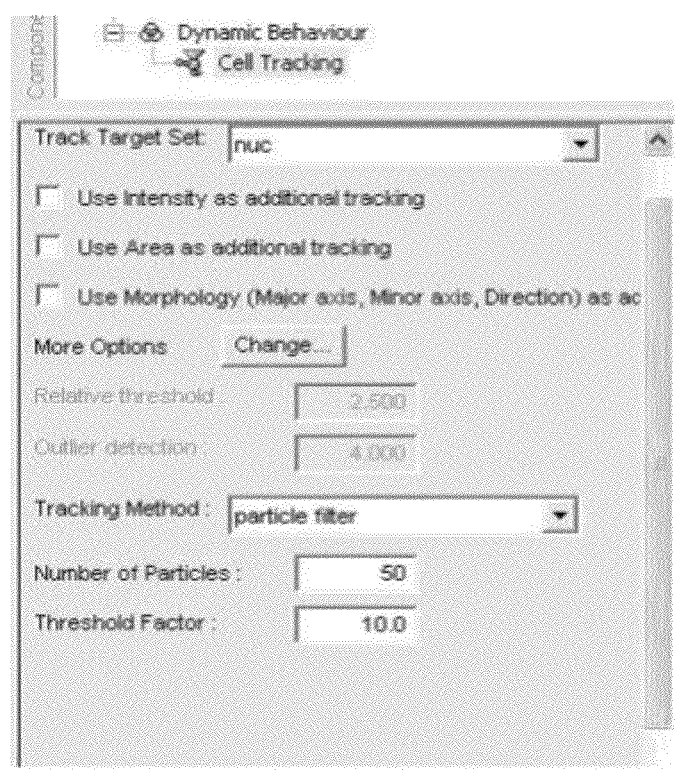
FIG. 3 is a computer screenshot of a particle filter algorithm graphical user interface in accordance with the invention.

The software has a biological material locator graphical user interface (GUI). The biological material locator GUI is a specially programmed GUI that has some of the same functionality as a typical GUI, which is a software program designed to allow a computer user to interact easily with the computer 203. The biological material locator GUI includes a screenshot that displays: 1. tracking target, 2 number of particles and 3. a threshold factor as shown in FIG. 3.

Particle Filter

As mentioned above, WO 2008/100704 discloses in detail one embodiment of a particle filter in which the verification of events according to the present invention may be utilized.

Image segmentation is the initial stage of processing for particle filter (i.e. cell tracking). Soon after the segmentation each cell of the image are assigned to a unique identification number (cell ID). The actual tracking algorithm of particle filter finds the correspondence between the cell IDs from two consecutive frames. The algorithm runs mainly in three steps called predict, observe/measure and update (FIG. 4).

Figure 4:
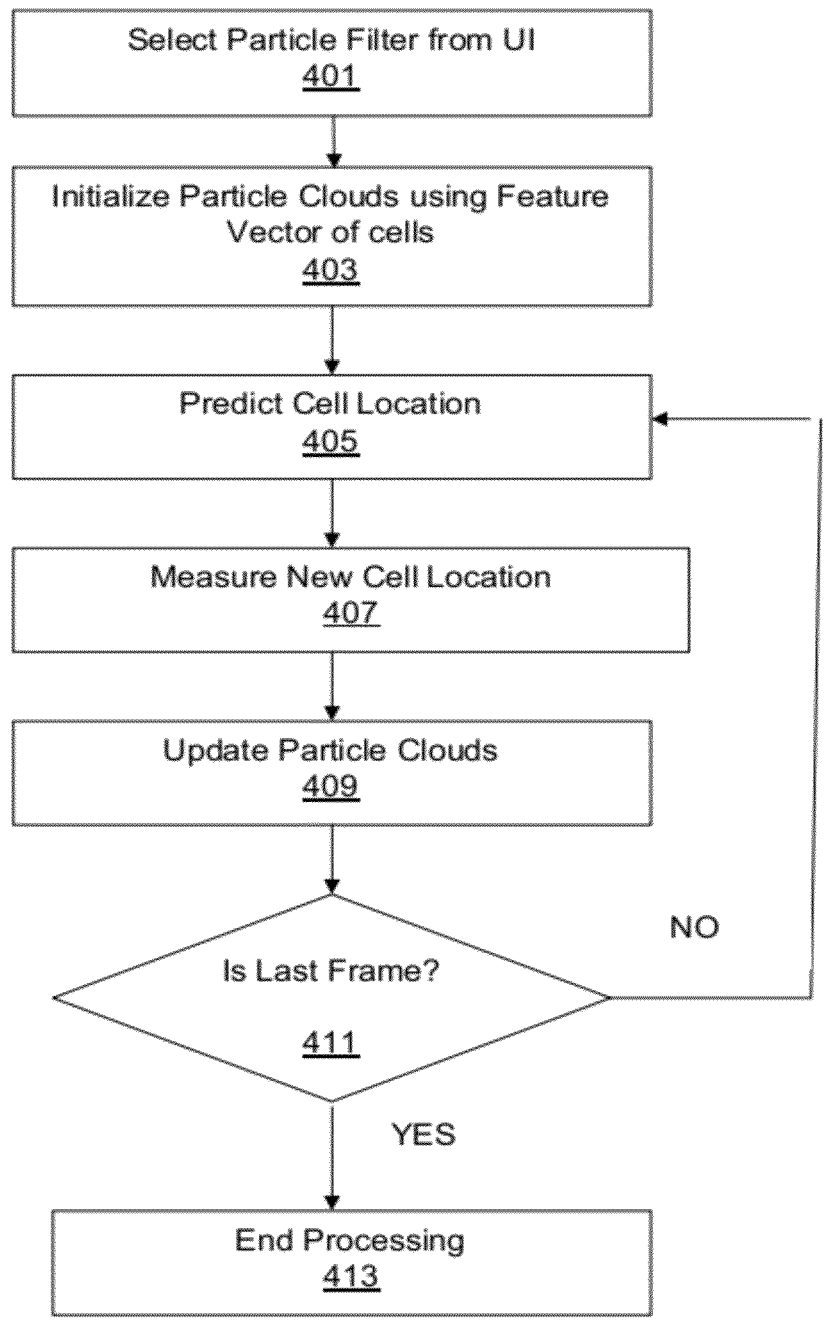
FIG. 4 shows a flow-chart of the particle filter algorithm in accordance with the invention.

FIG. 4 schematically depicts a flow-chart of one example of how the particle filter algorithm is employed in a cell tracking software application.

At block 401, a user initiate the cell particle filter algorithm stored in a protocol on processor 203a, whereby the user e.g. manipulates the biological material locator or cell tracking GUI to check off the particle filter algorithm from a drop down list of the biological material GUI on the computer screen shot of FIG. 3.

Next, at block 403 the particle filter algorithm is initialized. On selecting the analysis for a time-elapsed image stack activating particle filter as tracking algorithm, the first step is to update/create the particle clouds around each cell of the first image frame. The particle clouds are updated with the help of the feature vectors generated for each cell in the first image frame.

At block 405, the location of the biological materials or cells are predicted. This prediction step adds a small random perturbation to each sample of clouds pursuing a cell. This is a prediction of a cell to be in the next frame.

Next, at block 407, the new cell location is tracked and established. In this step the actual observed response (feature vector) of the cell at current time is compared to each particle's prediction as a means to evaluate the correspondence between cells. This step applies the core logic to find correspondence among the plurality of cells between previous and current image frame. This step generates the linked events by linking the current frame cells with the previous frame cells. The tracking of new cell locations 407 is described more in detail in the flow-chart of FIG. 5 below.

At block 409, there is an update to the particle clouds. The clouds are updated for the current frame measurements (feature vectors) and are eventually used for the next frame cells. Next, at block 411 there is a determination if it is the last frame. If is not the last frame then the process returns to predicting a cell location. If it is the last frame, then the process ends at block 413.

In the present embodiment, the correspondence between the cells from two consecutive image frames are accessed through two correspondence matrices generated using the entropy value for each cloud and feature vector. One correspondence matrix, herein referred to as Cloud_to_Measure captures the cell ID from the previous frame corresponding to one or many cell IDs from the current frame. This represents the child count. The other correspondence matrix, herein referred to as Measure_to_Cloud captures the cell ID from the current frame corresponding to one or many cell IDs from the previous frame, representing parent count. The purpose of the particle filter algorithm is to identify events linking the present (current frame) with the past (any earlier processed frame; usually simply the previous one). The linking result is presented in the form of an event e.g. unchanged (normal tracking), cell removal, cell migration, cell collision and cell division.

Each element of the correspondence matrices either contains no cell ID, single cell ID or many cell IDs. It produces a one-to-one match between the cells for normal tracking and follows one-to-many or many-to-one when an event is generated. The various events identified for biological domain are named as collision, division, migration of new cell and removal of a cell. Table 1 below show graphical illustrations of various cases and their correspondence measures generated by particle filter. The dashed circles in the table represent an existing cell and the dotted represents NULL cell. The interpretation key for the correspondence matrices is given below:

1. Cloud_to_Measure [A]=B or Measure_to_Cloud [B]=A
   represents a normal tracking (unchanged) as the cell ID A from the previous frame is linked with cell ID B from the current frame.
2. Cloud_to_Measure [A]=NULL
   represents a cell removal as no feature from the current frame is linked to cell ID A from previous frame.
3. Cloud_to_Measure [A]=B, C
   represents a cell division as cell ID A from the previous frame is linked with cell IDs B and C from the current frame.
4. Measure_to_Cloud [B]=NULL
   represents a cell migration or new cell as the current frame cell ID does not have any association with previous frame cells.
5. Measure_to_Cloud [B]=E, F
   represents a cell collision as single cell ID B of the current frame is linked to cell IDs E and F from the previous frame.

The tracking output generated by particle filter is entirely based upon the correspondence matrices discussed above.

TABLE 1

| Sl. No. | Graphical Representation (Previous → Current) | Correspondence Measures | Event Type |
|---|---|---|---|
| 1 | 9 → 11 | Cloud_to_Measure [9] = 11<br>Measure_to_Cloud [11] = 9 | Normal |
| 2 | 9 → NULL | Cloud_to_Measure [9] = NULL | Cell Removal (Ideal Case) |
| 3 | 9 → NULL; 10 → 11 | Cloud_to_Measure [9] = NULL<br>Cloud_to_Measure [10] = 11<br>Measure_to_Cloud [11] = 9, 10 | Cell Removal Verification required (Cell ID 9 should be removed as the inter cellular distance between 9 & 10 exceeds threshold) |
| 4 | NULL → 11 | Measure_to_Cloud [11] = NULL | Cell Migration (Ideal Case) |
| 5 | NULL → 11; 9 → 10 | Cloud_to_Measure [9] = 10, 11<br>Measure_to_Cloud [11] = NULL<br>Measure_to_Cloud [10] = 9 | Cell Migration Verification required (Cell ID 11 should be new as the inter cellular distance between 10 & 11 is more) |
| 6 | 9 → 11; 10 → NULL | Cloud_to_Measure [9] = 11<br>Cloud_to_Measure [10] = NULL<br>Measure_to_Cloud [11] = 9, 10 | Cell Collision Verification required (Cell ID 9 and 10 collide, as the inter cellular distance between 9 & 10 is below threshold) |

TABLE 1-continued

| Sl. No. | Graphical Representation (Previous → Current) | Correspondence Measures | Event Type |
|---|---|---|---|
| 7 | 9, 10 → 11 | Cloud_to_Measure [9] = 11<br>Measure_to_Cloud [11] = 10 | Cell Collision |
| 8 | 9 → 10, 11, NULL | Cloud_to_Measure [9] = 10, 11<br>Measure_to_Cloud [10] = 9<br>Measure_to_Cloud [11] = NULL | Cell Division Verification required (Cell ID 9 divide, as the inter cellular distance between 10 & 11 is below threshold) |
| 9 | 9 → 10, 11 | Cloud_to_Measure [9] = 10<br>Measure_to_Cloud [11] = 9 | Cell Division |
| 10 | 9, 12 → 10, 11 | Cloud_to_Measure [9] = 10, 11<br>Cloud_to_Measure [12] = 10<br>Measure_to_Cloud [10] = 9, 12<br>Measure_to_Cloud [11] = 9 | Ambiguous case (Should be normal tracking) |

This table is broken into three sections: 1. each occurrence of movement of the previous biological material (cell) from a previous frame to a current frame, 2. there is a correspondence measure for the movement from the previous frame to the current frame and 3. an event type. The correspondence measure informs the user of what happened to the cell as it moves from the previous frame to the current frame. The events describe what kind of event occurs when the cell moves from the previous frame to the current frame, such as a collision, a division, a migration or a removal of cells. This table includes ten different examples of what happens with a cell as it moves from the previous frame to the current frame.

For the first example, the cell ID 9 is at a previous frame then the cell ID 9 becomes cell ID 11 in a current frame. The correspondence measure is a simple Clouds_to_measure [9]=11 and Measure_to_Cloud [11]=9 which represents a normal tracking (unchanged event) as the cell ID 9 from the previous frame is linked with cell ID 11 from the current frame and vise versa. The event for this first example is a normal tracking, where the cell ID 9 has moved entirely to a new location with a cell ID 11. For the second example, the cell ID 9 is at a previous frame then cell ID 9 disappears when viewed at a current frame. The correspondence measure is Cloud_to_Measure[9]=Null that represents a cell removal as no feature from the current frame is linked to cell ID 9 from the previous frame. The event for this example is cell removal.

With respect to the third example, there are two cell IDS 9 and 10 at previous frames. Cell ID 9 at a previous frame has changed when it has moved to a current frame where there is a Cloud_to_Measure [9]=Null which indicates a cell removal event. For Cell ID 10 the correspondence measure Cloud_to_Measure [10]=11 indicates an unchanged tracking event. However, the correspondence measure Measure_to_Cloud [11]=9,10 indicates that there is a cell colision event where Cell ID 9 is in a previous frame then moved to combine with cell ID 10 in a current frame to form Cell ID 11. As indicated in the illustration, the distance between cell ID 9 and 10 is relatively large and therefore Cell ID 9 should be removed as the inter cellular distance between 9 & 10 exceeds threshold, as will be discussed in greater detail below.

For the fourth example, there is no cell ID in the previous frame, but in the current frame there is a new cell ID 11. The correspondence measure for this example is Measure_to_Cloud [11]=Null. This event is referred to as a cell migration or new cell as the current frame cell ID does not have any association with previous frame cells. With regard to the fifth example, there is only cell ID 9 in the previous frame, but in the current frame there are cell IDs 10 and 11. The correspondence measure Cloud_to_Measure [9]=10,11 indicates a cell division of cell ID 9, but the correspondence measures Measure_to_Cloud [10]=9 and Measure_to_Cloud [11]=Null indicates an unchanged event for cell ID 9 representing cell ID 10 in the current frame, and a cell migration event for cell ID 11. As indicated in the illustration, the distance between cell ID 10 and 11 is relatively large and therefore Cell ID 11 should be considered new (migrated) as the inter cellular distance between 10 & 11 exceeds threshold, as will be discussed in greater detail below.

For the sixth example, which includes Cell ID 9 and Cell ID 10, the Cell ID 9 has moved from the previous frame to the current frame to produce Cell ID 11. The correspondence measures Cloud_to_Measure [9]=11 and Cloud_to_Measure [10]=Null indicates an unchanged event for cell ID 9 representing cell ID 11 in the current frame, and a cell removal event for cell ID 10, but the correspondence measure Measure_to_Cloud [11]=9,10 indicates a cell collision of cell ID 9 and 10. As indicated in the illustration, the distance between cell ID 9 and 10 is relatively small and therefore the event shall be considered as a cell collision as the inter cellular distance between cell ID 9 & 10 is below threshold, as will be discussed in greater detail below.

In the seventh example, the Cell IDs 9 and 10 in their previous frame move to a current frame where they collide to form Cell ID 11. The correspondence measures are Cloud_to_Measure [9]=11 and Measure_to_Cloud [11]=10. From the figure it can be seen that the event is an unambiguous cell collision, however, it should be noted that none of the correspondence measures created by the particle filter recognizes the collision as both measures are one-to-one measures whereby it is not recognized as a collision by the particle filter. For the eighth example, the Cell ID 9 in the previous frame is divided into Cell ID 10 and Cell ID 11 in the current frame. The correspondence measure Cloud_to_Measure [9]=10,11 indicates a cell division of cell ID 9, but the correspondence measures Measure_to_Cloud [10]=9 and Measure_to_Cloud [11]=Null indicates an unchanged event for cell ID 9 representing cell ID 10 in the current frame, and a cell migration event for cell ID 11. As indicated in the illustration, the distance between cell ID 10 and 11 is relatively small and the event should be considered as a cell division of cell ID 9, as the inter cellular distance between 10 & 11 is below threshold, as will be discussed in greater detail below.

With regard to the ninth example, the Cell ID 9 in the previous frame has produced two Cell IDs 10 and 11 in the current frame. The correspondence measures are Cloud_to_Measure[9]=10 and Measure_to_Cloud[11]=9. However, as can be seen in the figure, the event is an unambiguous cell division event, however, it should be noted that none of the correspondence measures created by the particle filter recognize the division as all measures are one-to-one measures whereby it is not recognized as a collision by the particle filter. For the last example, there are two Cell IDS 9 and 12 in the previous frame. Cell ID 9 in the previous frame has produced Cell IDS 10 and 11, which has a correspondence measure of Cloud_to_Measure [9]=10,11, Cloud_to_Measure [12]=10, Measure_to_Cloud[10]=9, 12 and Measure_to_Cloud[11]=9. This represents an ambiguous event and should therefore be considered as a normal tracking event.

Figure 5:
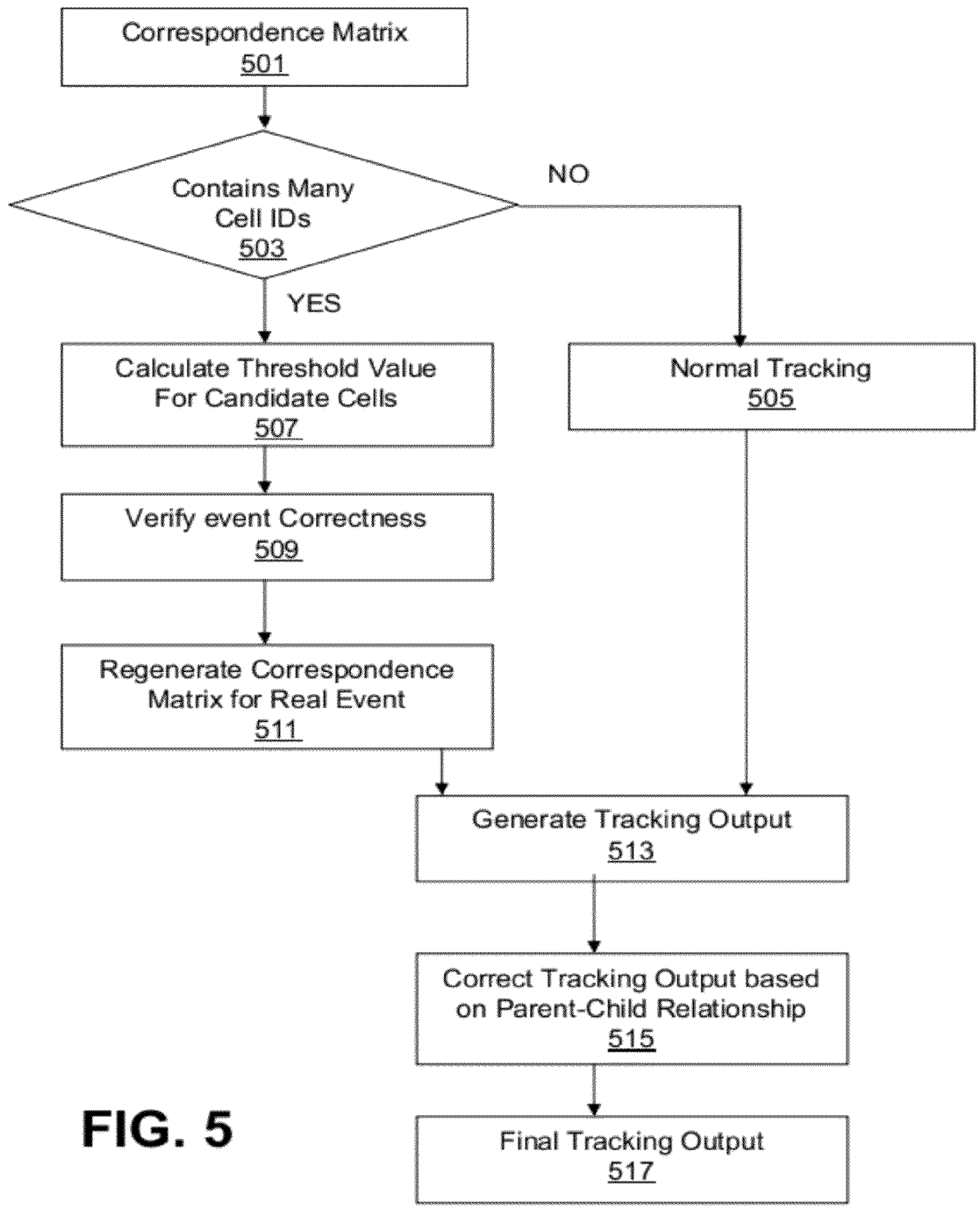
FIG. 5 is another flow-chart of a new approach of processing cell correspondence in accordance with the invention.

FIG. 5 shows a flow-chart of a new approach of processing cell correspondence under the measure new cell location of block 407. At block 501, the processing stage Measure New Cell Location generally creates the Correspondence Measures that is core to link the cells from two consecutive image frames as is discussed above. The element of these measures might contain one or multiple cell ID events associated with them. At block 503 the Correspondence Measures are evaluated to identify unambiguous single ID events, such as unchanged, cell removal or cell migration events (Examples 1, 2 and 4 in table 1) which do not need any further verification or interpretation and the data is directly used for generating tracking outputs in block 513 via normal tracking as indicated by block 505. Herein, generating tracking output 513 typically means the linking of the cell IDs from two consecutive image frames. However, if an element, at block 503, is identified to be associated with multiple cell IDs, then this is to be treaded as a tracking event. Once a tracking event is encountered, the correctness of the event is verified with the help of local threshold value at block 507 to 511. Automatic verification of events and calculation of local threshold value is described subsequently. During the verification of event correctness, new Correspondence Measure is created representing the verified event and finally the tracking output is generated at block 513.

Following the generation of tracking output at block 513 there may be performed a correction of tracking output based on "Parent-Child-Relationship" at block 515. The correction block 515 serves to capture collision or division events not previously identified, and to avoid that the tracking output contains duplication of same cell ID linking to multiple events. At block 515, the parent count represents how many cells from the previous frame that are linked with a single cell in the current frame. When the Parent count has a value of greater than 1, the event is established as a collision. Similarly, the child count represents how many cells from the current frame that are linked to a single cell in the previous frame. When the child count has a value of greater than 1, the event is established as a division. Hence, the processing based on parent-child-relation captures valid additional events though the same are not captured till tracking output generation. Thereafter the final tracking output is saved at block 517.

According to one embodiment, tracking events identified to be associated with multiple cell IDs, at block 503 undergoes verification in blocks 507 and 508 according to the following procedure:

1. Identify previous frame cell IDs for collision. Let previous frame cells X, Y are linked to cell Z in the current frame (i.e., Measure_to_Cloud [Z]=X, Y).
2. Find out if any of the IDs X or Y is linked to multiple IDs in Cloud_to_Measure matrix. If the Cloud_to_Measure matrix does not show multiple correspondences for any of the previous cells then this is considered as real collision, otherwise the event is considered as ambiguity. As for example Cloud_to_Measure [X]=Z, A, then this is an ambiguous case.
3. For an unambiguous event, the cells from the previous image are grouped together based on a threshold value generated at run-time. If an event parameter between the previous frame cell IDs is exceeding the threshold value then one is to be considered as a removed cell and the normally tracked cell is identified with the help of matrix Cloud_to_Measure.
4. The ambiguous case is a representative of either normal tracking or division of the cells other than the ambiguous cell. The cells those are really to undergo division are assessed through the cell correspondence captured in Measure_to_Cloud matrix.
5. The similar logic as explained in steps 1 through 4 is repeated when a cell division is encountered. This only interchanges the two different matrices and the current or previous frame.

At block 507, an adaptive threshold value is calculated for each event to verify if the event is real or not. According to one embodiment, the adaptive threshold value is calculated based on spatial information available from the previous image(s) and/or the current image. More specifically the threshold value may be calculated from spatial information relating to the cells involved in the generated event. The threshold value may e.g. be calculated based on the size of one or more of the cells involved as the kinetic behavior of cells at least partially is related to their size. In addition or in lieu thereof the threshold value may be based on kinetic parameters measured from two or more previous images.

One example of a process for calculating the adaptive threshold value involves the steps:

1. Use area of the group of cells for generating event as the input for this algorithm.
2. Find the smallest area among the cells that are supposed to generate event.
3. Calculate the threshold value (T) as a multiple of the radius of the smallest cell for the event.

The multiplier in this example is designed as a user defined parameter (i.e. Threshold Factor in FIG. 1). The value of this multiplier is more for high speed and very random movement of the cells. However, the multiplier value should be low for low speed and steady movement of cell over time-elapsed image. A typical range of the multiplier is defined from 7.5 to 15.

Maximum events are considered correct at a certain value and events are false beyond this. The adaptive threshold value has a saturation value beyond that particle filter captures no extra event.

It should be noted that the threshold value is local and for each event a new threshold is calculated, and that the threshold value does not affect the normal tracking i.e. small change to the threshold value does produce very different output.

At block 509 the correctness of the event under validation is verified by comparing the adaptive threshold value with an event parameter for said event. Like the adaptive threshold value, the event parameter may e.g. be based on spatial information available from the previous image(s) and/or the current image relating to the cells involved in the generated event. For generated cell collision events, the event parameter may e.g. be a spatial relationship between the linked cells in the prior image, and for generated cell division events, the event parameter may be a spatial relationship between the linked cells in the posterior image. More specifically, the event parameter may be the distance between the linked cells involved in the event.

As mentioned, at block 515 the Tracking Output is corrected based on Parent-Child Relationship. Illustration 7 & 9 shown in Table 1 represents a very special case of collision and division respectively. This demonstrates possible one-to-one relationship between the previous and current frame cell IDs, hence, indicating a normal tracking scenario. According to one embodiment, this ambiguity may be corrected through considering parent-child-relationship by obtaining the parent and child count from the tracking output. Parent count represents the number of cells from the previous frame connecting to unique cell in the current frame. Moreover, the child count represents the number of cells from the current frame connecting to unique cell in the previous frame, and may comprise the steps:
1. Calculate the parent and child count from the already generated tracking output.
2. For parent count >1 or child count >1, create cell correspondence between the previous frame and current frame cell ID, i.e. parent count >1 corresponds to a collision, and child count >1 corresponds to a division.
3. Verify the correspondence/event using automatically generated threshold value T.
4. Update the tracking output based on the new event generated.

Continuous updating of the cloud pursuing normally tracked cell might shift the cell itself virtually to a new location. Therefore the assembly of clouds is updated using cell measures (feature vector) from current frame.

Examples Demonstrating Particle Filter Performance

Figures 6A, 6B:
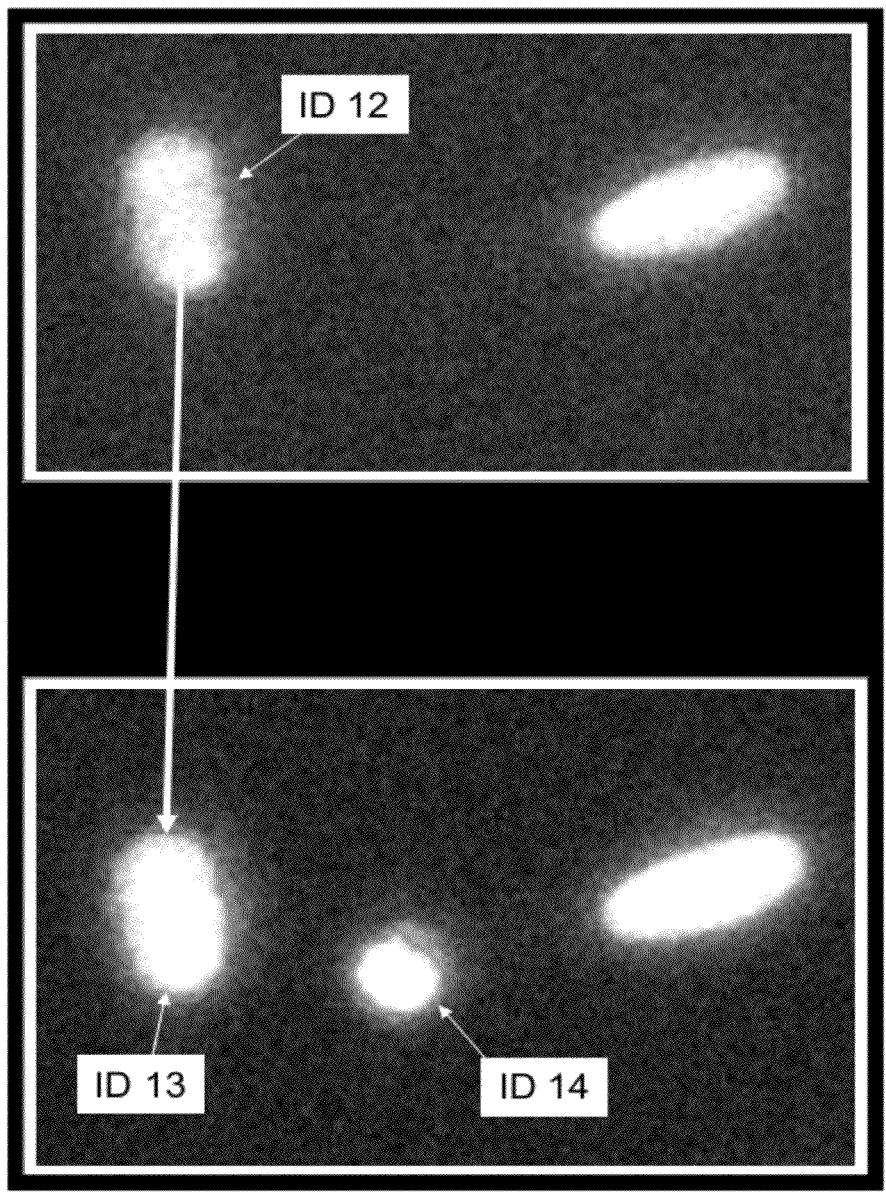
FIGS. 6A and 6B are graphical illustrations of a previous image and current image after a new threshold logic is applied in accordance with the invention.

FIGS. 6a and 6b shows one example wherein the introduced improvement of the particle algorithm by verification of events has been implemented. FIG. 6a shows the previous frame and FIG. 6b the current. When the images 6a and 6b were evaluated by particle filtering, the tracking output for cell ID 12 was Cloud_to_Measure [12]=13, 14, whereby this event is captured as a cell division event. However after verification of the correctness of the cell division event, the event is corrected to represent migration of one new cell, and unchanged events for the two cells in the previous frame, ie. Cloud_to_Measure [12]=13 and Measure_to_Cloud [14]=NULL.

Figures 7A, 7B:
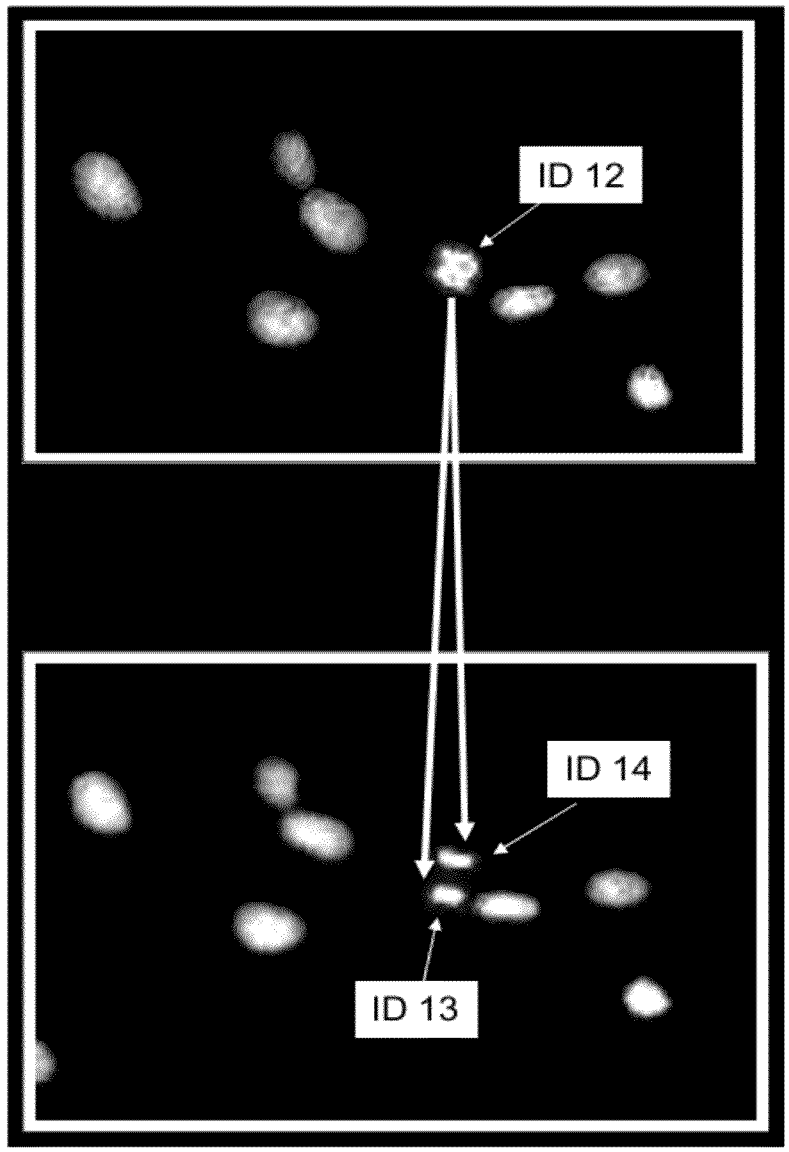
FIGS. 7A and 7B are graphical illustrations of a previous image and current image showing a cell division detected by the particle filter in accordance with the invention.
Figures 8A, 8B:
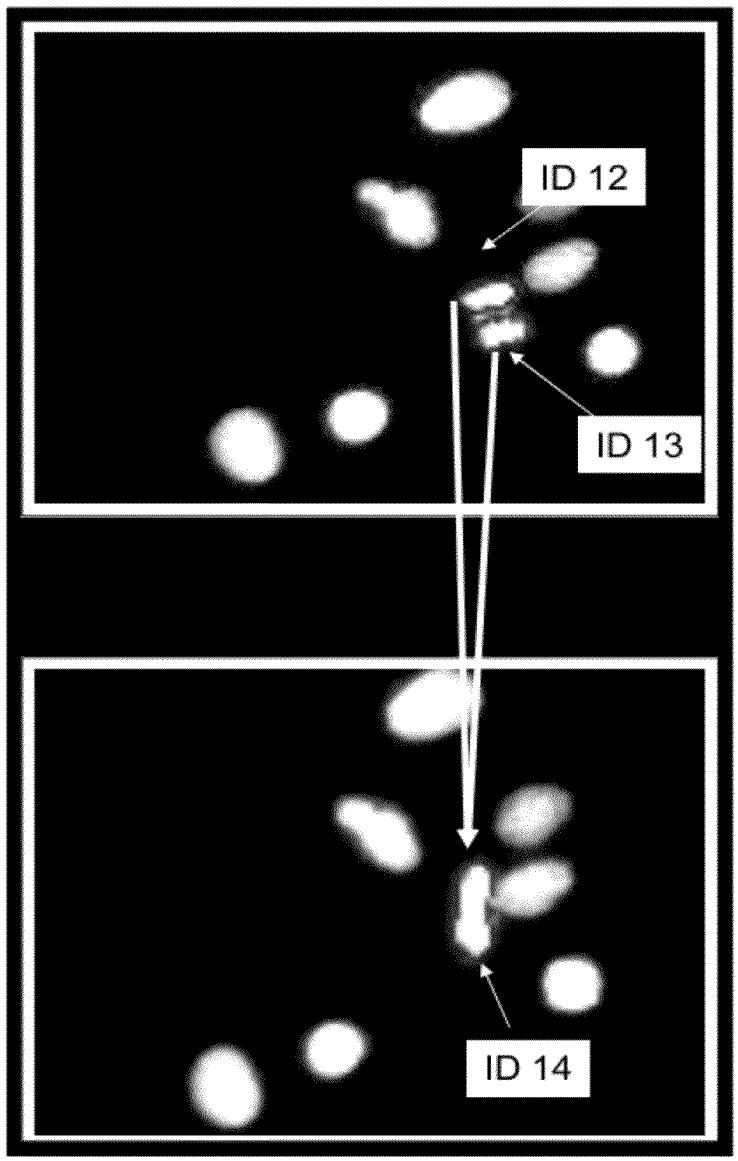
FIGS. 8A and 8B are graphical illustrations of a previous image a current image showing a cell collision detected by the particle filter in accordance with the invention.

FIGS. 7a and 7b shows another example wherein evaluation by particle filtering captures this as a cell division event with a one-to-many relationship i.e. Cloud_to_Measure [12]=13, 14, Measure_to_Cloud [13]=12 and Measure_to_Cloud [14]=12. In this case, the verification of the correctness of the cell division event yields that the event is a true cell division. Similarly, FIGS. 8a and 8b shows an example wherein evaluation by particle filtering captures this as a cell collision event with a many-to-one relationship, i.e. Cloud_to_Measure [12]=14, Cloud_to_Measure [13]=14 and Measure_to_Cloud [14]=12, 13, and the verification of the correctness of the event yields that the event is a true cell collision.

In a performance comparison of particle filter with proximity it is shown that the performance of the particle filter tracking function is improved by about 30%. The Particle filter UI leaves the option for inputting the number of particles as shown in FIG. 3. Performance of particle filter depends on the number of particles. More number of particles always produces better accuracy of tracking. Number of particle should be more for when cells are densely packed. During experimentation on the InCell acquired time-lapsed image stacks, we have found the following observations:

Number of particles=25 works well when cells are in low density.
Number of particles=50; when cells are in medium density.
Number of particles=100 to 150; when cells are in high density.

The improved particle filter algorithm is evaluated in terms of accuracy against the existing tracker (i.e. proximity). The evaluation is carried out on two separate image stacks, cell track-3 and 171006-cell tracking-22 hrs-2.xdce. For each image stack, a single segmentation technique applied to both tracking algorithm. Suitable parameters are used to capture the efficiency of proximity (i.e. Relative Threshold=2.5 and Outlier Detection=4.0 for both image stack). However, the particle filter has been evaluated with different values of Number of Particles and Threshold Factor. The analysis result is displayed in the Table 2 below.

TABLE 2

Accuracy comparison particle filter vs. proximity

| Tracking Algorithm | Total Events | Correct Events | Incorrect Events | Detection Accuracy* (%) |
|---|---|---|---|---|
| Image Stack: cell track-3 | | | | |
| Proximity | 18 | 9 | 9 | 50 |
| Particle Filter | 13 | 11 | 2 | 84.62 |
| Image Stack: 171006-cell tracking-22 hrs-2.xdce | | | | |
| Proximity | 157 | 81 | 76 | 51.59 |
| Particle Filter | 152 | 129 | 23 | 84.87 |

Note:
*Detection accuracy is the percentage of correct events with respect to detected events.

This invention provides an automated system and method that allows a user to track the movement of an object, such as at least one cell amongst a plurality of cells as it moves from one point to another over time in order for the user to determine how the at least one cell functions. The user is able to track the movement of the at least one cell and determine if the at least one cell structure has changed, such as the at least one cell experiencing cell division or if two or more cells merge together. This user is able to optimally track the at least one cell to find an approximate location of at least one the cell as it moves in time and distance. Thus, this invention provides the user with a means to track cell movement to study cell function.

Although the present invention has been described above in terms of specific embodiments, many modification and variations of this invention can be made as will be obvious to those skilled in the art, without departing from its spirit and scope as set forth in the following claims.

What is claimed is:
1. A method of dynamic cell tracking in a sample comprising the steps:
generating a correspondence measure between cells in two consecutive time-elapsed images of a sample;
evaluating said correspondence measure to generate events linking individual cells in the two images, the events being selected from the group: unchanged, cell removal, cell migration, cell collision and cell division;
providing a tracking output of events linking individual cells in the two images;
wherein the step of establishing linking events involves verifying the correctness of generated cell collision and cell division events, by calculating an adaptive threshold value for each such event and comparing the threshold value with an event parameter, and wherein the adaptive threshold value is calculated from the size of at least one of the cells involved in the generated event.
2. The method of claim 1, wherein the step of generating a correspondence measure involves a particle filter algorithm.
3. The method of claim 1, further comprising the step of:
calculating, for each tracked cell, a parent and child count from the generated tracking output;
when parent count >1, a collision event is generated linking parent cells to child cell,
when child count >1, a division event is generated linking child cells to parent cell, verifying the correctness of generated cell collision and cell division events, by calculating an adaptive threshold value for each such event and comparing the threshold value with an event parameter; and updating the tracking output.

4. A system for dynamic cell tracking in a sample, comprising an imaging system arranged to provide consecutive time-elapsed images of the sample, and an image-receiving device arranged to track cells in a sample in accordance with the method of claim 1.

5. The method of claim 1, wherein the adaptive threshold value is proportional to the radius of the smallest cell involved in the generated event.

6. The method of claim 5, wherein the adaptive threshold value is calculated by multiplying the radius of the smallest cell with variable depending on the cell motion in the sample.

7. The method of claim 5, wherein the adaptive threshold value is calculated by multiplying the radius of the smallest cell with a user defined parameter in the range of 5 to 20, preferably 7.5 to 15.

8. The method of claim 1, wherein:
for generated cell collision events, the event parameter is a spatial relationship between the linked cells in the prior image; and
for generated cell division events, the event parameter is a spatial relationship between the linked cells in the posterior image.

9. The method of claim 8, wherein:
for generated cell collision events, the event parameter is the distance between the linked cells in the prior image; and
for generated cell division events, the event parameter is the distance between the linked cells in the posterior image.

* * * * *